United States Patent
Amstutz et al.

(10) Patent No.: US 9,543,609 B2
(45) Date of Patent: Jan. 10, 2017

(54) REDOX FLOW BATTERY FOR HYDROGEN GENERATION

(71) Applicant: EOS Holding SA, Lausanne (CH)

(72) Inventors: Veronique Amstutz, Lausanne (CH); Kathryn Ellen Toghill, Gwynedd (GB); Christos Comninellis, Mex (CH); Hubert Hugues Girault, Ropraz (CH)

(73) Assignee: EOS Holding SA, Lausanne (CH)

( * ) Notice: Subject to any disclaimer, the term of this patent is extended or adjusted under 35 U.S.C. 154(b) by 357 days.

(21) Appl. No.: 14/382,732

(22) PCT Filed: Mar. 4, 2013

(86) PCT No.: PCT/EP2013/054238
§ 371 (c)(1),
(2) Date: Sep. 3, 2014

(87) PCT Pub. No.: WO2013/131838
PCT Pub. Date: Sep. 12, 2013

(65) Prior Publication Data
US 2015/0017494 A1    Jan. 15, 2015

Related U.S. Application Data (60) Provisional application No. 61/606,712, filed on Mar. 5, 2012.

(51) Int. Cl.
*H01M 8/20* (2006.01)
*H01M 8/18* (2006.01)
(Continued)

(52) U.S. Cl.
CPC ............... *H01M 8/20* (2013.01); *C25B 1/02* (2013.01); *C25B 15/08* (2013.01); *H01M 4/8615* (2013.01);
(Continued)

(58) Field of Classification Search
CPC ....... H01M 8/0656; H01M 8/188; H01M 8/20
(Continued)

(56) References Cited

U.S. PATENT DOCUMENTS

| 4,159,366 A | 6/1979 | Thaller |
| 4,469,760 A | 9/1984 | Giner et al. |

(Continued)

OTHER PUBLICATIONS

C. Ponce De Leon et al., "Redox Flow Cells for Energy Conversion", Journal of Power Sources, vol. 160, pp. 716-732, May 2006.
(Continued)

*Primary Examiner* — Basia Ridley
*Assistant Examiner* — James Erwin
(74) *Attorney, Agent, or Firm* — Howson & Howson, LLP (57) ABSTRACT

The present invention combines the storage capacity of redox flow batteries and the production of hydrogen and other products of chemical redox reactions. The redox couple of each electrolyte is chemically regenerated on a specific catalyst bed 11, replacing the discharging processes of the battery, while oxidizing or reducing other species present. This allows for the production of hydrogen on the cathodic side, and various useful products on the anodic side, such as oxygen for fuel cell application. The proposed system uses a dual circuit arrangement from which electrolytes 8 may be pumped through the catalyst beds 11 as desired, once they are in their charged state.

14 Claims, 8 Drawing Sheets

(51) Int. Cl.
| | |
|---|---|
| H01M 8/06 | (2016.01) |
| H01M 4/86 | (2006.01) |
| C25B 15/08 | (2006.01) |
| C25B 1/02 | (2006.01) |
| H01M 4/96 | (2006.01) |

(52) U.S. Cl.
CPC ......... H01M 4/8631 (2013.01); H01M 8/0656 (2013.01); H01M 8/188 (2013.01); H01M 4/96 (2013.01); Y02E 60/528 (2013.01); Y02P 20/584 (2015.11)

(58) Field of Classification Search
USPC .......................................................... 429/70
See application file for complete search history.

(56) References Cited

U.S. PATENT DOCUMENTS

| | | | |
|---|---|---|---|
| 4,576,878 | A | 3/1986 | Gahn |
| 4,786,567 | A | 11/1988 | Skyllas-Kazacos et al. |
| 4,882,241 | A | 11/1989 | Heinzel |
| 4,956,244 | A | 9/1990 | Shimizu et al. |
| 5,258,241 | A | 11/1993 | Ledjeff et al. |
| 5,660,940 | A | 8/1997 | Larsson et al. |
| 6,005,183 | A | 12/1999 | Akai et al. |
| 7,270,911 | B2 | 9/2007 | Clarke et al. |
| 7,740,977 | B2 | 6/2010 | Lepp et al. |
| 7,820,321 | B2 | 10/2010 | Horne et al. |
| 2006/0063065 | A1* | 3/2006 | Clarke ................ H01M 4/8631 429/105 |
| 2010/0003545 | A1 | 1/2010 | Horne et al. |
| 2011/0086247 | A1* | 4/2011 | Keshavarz .......... H01M 4/8803 429/9 |
| 2013/0071702 | A1* | 3/2013 | Longman ............ B01F 3/04262 429/50 |

OTHER PUBLICATIONS

M. Bartolozzi, "Development of Redox Flow Batteries. A Historical Bibliography", Journal of Power Sources, vol. 27, pp. 219-234, Apr. 1989.
US Dept of Energy, "Fuel Cell Technologies Program—Hydrogen Production", 2 page pamphlet, Nov. 2010.
A. Paulenova et al., "Redox Potentials and Kinetics of the Ce3+/Ce4+ Redox Reaction and Solubility of Cerium Sulfates in Sulfuric Acid Solutions", Journal of Power Sources, vol. 109, pp. 431-438, Feb. 2002.
D. Merki et al., "Amorphous Molybdenium Sulfide Films as Catalysts for Electrochemical Hydrogen Production in Water", Chemical Science, vol. 2, No. 7, pp. 1262-1267, Apr. 2011 (one page Abstract only).
E. Rivera-Munoz et al., "Silica Gel-Supported, Metal-Promoted MoS2 Catalysts for HDS Reactions", Catalysis Letters, vol. 94, No. 3-4, pp. 199-204, May 2004 (one page Abstract only).
Y. Li et al., "MoS2 Nanoparticles Grown on Graphene: an Advanced Catalyst for the Hydrogen Evolution Reaction", Journal of American Chemical Society, vol. 133, No. 19, pp. 7296-7299, Apr. 2011 (one page Abstract only).
G. An et al., "Direct Synthesis of Porous Molybdenum Disulfide Materials using Silica Sol as the Template", Journal of Porous Materials, vol. 18, No. 6, pp. 673-676, Dec. 2011 (one page Abstract only).
X. Guan et al., "Application of Permanganate in the Oxidation of Micropollutants: a Mini Review", Frontiers of Environmental Science & Engineering in China, vol. 4, No. 4, pp. 405-413, Dec. 2010 (one page Abstract only).
L. Li et al., "A Stable Vanadium Redox-Flow Battery with High Energy Density for Large-Scale Energy Storage", Advanced Energy Materials, vol. 1, No. 3, pp. 394-400, May 2011 (one page Abstract only).
X. Li et al., "Ion Exchange Membranes for Vanadium Redox Flow Battery (VRB) Applications", Energy and Environmental Science, vol. 4, pp. 1147-1160, Mar. 2011 (one page Abstract only).
P.K. Leung et al., "Ce(III)/Ce(IV) in Methanesulfonic Acid as the Positive Half Cell of a Redox Flow Battery", Electrochimica Acta, vol. 56, No. 5, pp. 2145-2153, Feb. 2011 (one page Abstract only).
M. Koper, "Thermodynamic Theory of Multi-Electron Transfer Reaction: Implications for Electrocatalysis", Journal of Electroanalytical Chemistry, vol. 660, No. 2, pp. 254-260, Sep. 2011 (one page Abstract only).
M. Hara et al., "Photocataytic Oxidation of Water by Silica-Supported Tris(4,4'-dialkl-2,2'-bipyridyl)ruthenium Polymeric Sensitizers and Colloidal Iridium Oxide", Chemical Materials, vol. 13, No. 12, pp. 4668-4675, 2001 (month unknown) (one page Abstract only).

* cited by examiner

REDOX FLOW BATTERY FOR HYDROGEN GENERATION

BACKGROUND TO THE INVENTION

This invention relates to a redox flow battery system for electrical energy storage and hydrogen production.

There is a clear need for new and sustainable power production technologies, which produce green emissions, negligible waste, are low cost, efficient and suitable for a wide range of geographical conditions. Technology such as this that is already widely commercialised includes photovoltaic panels and wind farms. A major setback in the widespread use of photovoltaics and wind-based power sources is the variable and unpredictable production of electricity, owing to a direct dependence on sunlight or wind. Intermittent energy production prevents a supply and demand routine, with high currents difficult to produce on demand at peak times. For a future "smart grid" it is therefore as important to develop new technology for large-scale energy storage, as it is to efficiently harness renewable energy so as to fully integrate intermittent and green energy production. Large-scale storage systems would already be beneficial for "load levelling", i.e. the combination of the storage of energy produced but not immediately consumed, as, for instance, nuclear energy produced during the night when energy demand is at its lowest, with its utilization during high demand periods.

Redox flow batteries (RFBs) have been proposed for large-scale energy storage systems. RFBs do not require specific geographical siting, or extensive maintenance, they have a long lifetime, easy implementation and they are resistant to charge and discharge microcycles. The main disadvantage of RFBs is that energy storage capacity is determined by the solubility of the actives electrolytes and that large tanks are thus usually required. They may be applied to load levelling, wind farms and photovoltaic panels [Ponce de León, C., Frías-Ferrer, A., González-García, J., Szánto, D. A., and Walsh, F. C. (2006). Redox flow cells for energy conversion. *Journal of Power Sources* 160: 716-732]. A RFB is a system in which two half-cells of the battery are each connected to a storage tank containing a solution composed of the redox species and the supporting electrolyte. An ion-exchange membrane separates the half-cells, whilst allowing ion transfer and electrical continuity during charging and discharging of the cell. During charging, the negatively polarised electrode is the cathode, and the electrolyte, in which the redox species is being reduced, is termed the catholyte. Correspondingly, the positive half-cell has the anode and the electrolyte termed the anolyte. Pumps are used to transfer electrolytes from their respective storage tanks to the electrochemical cell, and to the storage tanks again. The key to the system is in choosing appropriate redox species. Generally the redox couples and the electrodes are selected to achieve close-to-reversible kinetics, allowing higher voltage and energy efficiencies of the battery.

Since the study of the first RFB in 1973 a variety of redox species have been used in the catholyte and anolyte [Bartolozzi, M. (1989). Development of redox flow batteries. A historical bibliography. *Journal of Power Sources* 27: 219-234], and consequently a wide range of RFBs have been patented [e.g. U.S. Pat. No. 4,882,241, U.S. Pat. No. 4,469,760]. The vanadium redox flow battery (VRFB) is a particular case, as it works with vanadium species in both half-cells: the redox couple V(III)/V(II) on the cathodic side, and the redox couple V(V)/V(IV) on the anodic side [U.S. Pat. No. 4,786,567]. It has the advantage that cross-diffusion of cations through the membrane does not affect the cycle current efficiency, and allows for a longer battery lifetime. A VRFB charges when connected to an electricity source, and discharges when connected to an electrical load. The electrolytes flow in one direction through the half-cells, regardless of the process underway, yet the electrochemical reaction taking place differs. The corresponding reactions are:

At the cathode:

$$V^{3+}+e^-\rightarrow V^{2+} \text{(charge)} \tag{1a}$$

$$V^{2+}\rightarrow V^{3+}+e^- \text{(discharge)} \tag{1b}$$

At the anode:

$$V^{4+}\rightarrow V^{5+}+e^- \text{(charge)} \tag{2a}$$

$$V^{5+}+e^-\rightarrow V^{4+} \text{(discharge)} \tag{2b}$$

Since their invention RFBs, and especially all-vanadium RFBs, have been applied to various systems. For instance they have been successfully connected to wind turbines, coupled to solar panels [U.S. Pat. No. 6,005,183], turned into a biofuel powered fuel cell [U.S. Pat. No. 5,660,940], assembled into a stack for a load levelling application [U.S. Pat. No. 7,820,321], and connected to a system that electrochemically regenerated both degraded electrolytes [U.S. Pat. No. 4,956,244].

Hydrogen gas is becoming increasingly important in energy production and consumption management, and is considered as a potential means for energy storage as it can be used as a clean fuel for electricity production. Indeed, in a fuel cell, $H_2$ and $O_2$ gases react to generate electricity and water as the only products. The predominant methods of obtaining hydrogen are steam methane or coal reforming, gasification, and alkaline water electrolysis over nickel electrodes [http://www.hydrogen.energy.gov/pdfs/doe_h2_production.pdf]. The first two processes have the drawback of evolving $CO_2$, and electrolysis cannot be applied intermittently as the nickel electrodes degrade rapidly due to open-circuit corrosion. More sustainable systems with longer lifetimes are therefore needed for $H_2$ production, and some alternatives are already under development [http://www.hydrogen.energy.gov/pdfs/roadmap_manufacturing_hydrogen economy.pdf].

One major aspect in the study of hydrogen evolution is catalysing the reaction, but the most efficient catalyst known to-date is platinum. Platinum is rare and expensive, and is therefore pushing manufacturers and researchers to seek alternative, lower cost, abundant, stable, and equivalently efficient catalysts. One such catalyst is molybdenum sulfide, which has been reported to be an efficient catalyst for $H_2$ evolution. This catalyst has been primarily used in the hydrodesulfurisation reaction in refinery industries, but is now attracting attention for the catalysis of the reaction of hydrogen formation. [Merki, D., Fierro, S., Vrubel, H. and Hu, X. L. (2011) Amorphous molybdenum sulphide films as catalysts for electrochemical hydrogen production in water. *Chemical Science* 2(7) 1262-1267; Li, Y., Wang, H., Xie L., Liang, Y., Hong, G., and Dai, H. (2011) $MoS_2$ nanoparticles grown on graphene: an advanced catalyst for hydrogen evolution reaction. *Journal of American Chemical Society* 133 (19) 7296-7299]. This heterogeneous catalyst may be deposited on silica [Rivera-Muñoz, E., Alonso, G., Siadati, M. H., and Chianelli, R. R. (2004). Silica gel-supported, metal-promoted $MoS_2$ catalysts for HDS reactions. *Catalysis Letters* 94 (3-4):199-204; An, G., Xiong, C., Lu, C., and Chen, Z. (2011). Direct synthesis of porous molybdenum disulfide materials using silica sol as template. *Journal of Porous Materials* 18: 673-676], should it need to be separated from the products, as for instance, where a fixed or fluidized catalytic bed is used.

SUMMARY OF THE INVENTION

The present invention attempts to harness the considerable chemical energy stored in the charged electrolytes of a RFB. A RFB is combined with catalytic beds for the regeneration of the redox species by chemical reaction producing reduction and oxidation products, including $H_2$ and $O_2$, thus creating an alternative fuel source during maximum energy storage (i.e. low energy demand), but also retaining the conventional attributes of the RFB.

The invention thus combines the advantages of a RFB with the production of hydrogen in the cathodic reservoir and oxygen or oxidation products (e.g. for wastewater treatment) in the anodic reservoir. Moreover this system offers a way to circumvent one of the largest disadvantages of a RFB, which is its low energy density compared to storage means nowadays available. The dual-circuit RFB thus provides a storage platform for the delivery of low cost or renewably sourced energy during discharging, but also the production of alternative fuels during maximum charge. This system leads to two means by which an energy excess may be saved, first through the storage of chemical energy in the RFB, and secondly through the formation and subsequent storage of hydrogen. In the case of hydrogen and oxygen production, this invention is performing indirect water electrolysis, through redox mediators, and catalysed reactions.

The invention provides a RFB system according to claim 1. Optional features of the invention are set out in the dependent claims.

The present invention enables chemical energy storage in the electrolytes of the RFB, and the conversion of overflow energy from the grid or renewable energy sources into hydrogen, and possibly oxygen, using catalytic beds enclosed in the system. It is well known that hydrogen is considered a promising clean chemical energy carrier, and is therefore a means of energy storage complementary to the conventional RFB. The addition of catalytic beds to a RFB therefore allows a higher storage capacity, which is an advantage for two reasons; first, more electricity can be stored in a single installation, during off-peak periods (in the case of a constant energy production rate), and secondly, more electricity can be injected into the grid during on-peak periods, when the power consumption rate is higher than its production rate.

This system may also be envisaged as a method for primarily producing hydrogen, where the size of the RFB storage tanks is reduced in favour of increasing the hydrogen storage tanks. Furthermore, this system could be turned into a continuous system if needed, by using at least two storage tanks for each electrolyte of the RFB.

A RFB works on the basis of two circulating liquid electrolytes, each one containing a redox couple, and each one cycling between a storage tank and the electrochemical cell. The only electrical connection between both liquids, except the external electrical circuitry, is the ion-exchange membrane, which separates the two chambers of the electrochemical cell. The main function of the redox species is to accept (reduction, cathode) and donate (oxidation, anode) electrons during the charging process and, inversely, to donate (oxidation, cathode) or accept (reduction, anode) electrons during the discharging process. More specifically, for an all-vanadium redox flow battery (VRFB), see reactions 1a, 1b, 2a and 2b.

In the present invention, the function of the redox couples is extended to the role of electron carriers. Both species formed during the charging process are able to donate (catholyte) or accept (anolyte) one electron to/from another chemical species, particularly in the presence of specific catalysts, according to reactions 3 and 4, for the particular case of a VRFB.

In the catholyte:

$$V^{2+} \rightarrow V^{3+} + e^- \text{(discharge or chemical regeneration in the catalytic bed)} \quad (3)$$

In the anolyte:

$$V^{5+} + e^- \rightarrow V^{4+} \text{(discharge or chemical regeneration in the catalytic bed)} \quad (4)$$

These one-electron exchange processes regenerate the initial electrochemical species (discharged state), which are directed back into the electrochemical cell and repeat the charging process. As a consequence of reactions 3 and 4, the mediator redox couples are strongly related to the chemical species that will accept the electron (e.g. $H^+$ in the catholyte) or donate electrons (e.g. $H_2O$ in the anolyte). Indeed, some chemical species will accept or donate an electron more easily than others. This ability to donate or accept an electron is quantified by the standard reduction potential $E^0_{red}$ of the chemical species. The standard reduction potentials for different species, cathodic or anodic mediators and chemical donors and acceptors, are given in Table 1.

TABLE 1

Standard reduction potentials for some cathodic and anodic mediators and some chemical species.

| Cathodic mediator | $E^0_{red}$/V | Anodic mediator | $E^0_{red}$/V | Chemical species | $E^0_{red}$/V |
|---|---|---|---|---|---|
| $Ti^{3+}/Ti^{2+}$ | −0.37 | $VO^{2+}/VO_2^+$ | 1.00 | $H^+/H_2$ | 0 |
| $V^{3+}/V^{2+}$ | −0.255 | $MnO_4^-/Mn^{2+}$ | 1.51 | $O_2/H_2O$ | 1.23 |
| $Cr^{3+}/Cr^{2+}$ | −0.41 | $Mn^{3+}/Mn^{2+}$ | 1.54 | glycerol | ca. 0.8 |
| $Zn^{2+}/Zn$ | −0.76 | $Ce^{4+}/Ce^{3+}$ | 1.61* | $Cl_2/Cl^-$ | 1.36 |
| | | $Co^{3+}/Co^{2+}$ | 1.83 | $SO_4^{2-}/SO_2$ | −0.17 |
| | | $BrO_3^-/Br^-$ | 1.42 | | |

*Potential in $HNO_3$. $E^0$ is highly dependent on acidic medium and concentration Depending on the chosen cathodic and anodic redox species, various chemical reactions may be selected for the regeneration of the electrolytes. As mentioned earlier, one of the aims of this invention is to produce hydrogen. The chemical species will thus be a strong acid, in which protons, dissociated in the electrolyte, may be reduced to $H_2$ gas. Some of the redox couples that are considered as electron donors for the cathodic side, appropriate for the formation of hydrogen, are indicated in Table 1. The reaction at the anodic side is less specific, and may range from the oxidation of water to the oxidation of organic or inorganic compounds, such as water pollutants using one of the anodic redox mediators listed in Table 1. Oxygen production may be desirable as it is also required for hydrogen fuel cells alongside hydrogen. Water oxidation to oxygen also provides protons that can be reintroduced to the RFB preventing depletion by hydrogen generation. The oxidation of chloride into chlorine is also of interest, as chlorine is a compound required in the synthesis of many organic and inorganic compounds, and its hydrolysed products are implied in water disinfection. The oxidation of organic compounds in the frame of wastewater treatment is another possibility. Indeed, $KMnO_4^-$ is known as a good oxidant for organic pollutants, is cheap, and does not generate toxic by-products, compared to the other oxidants used in wastewater treatment [Guan, X. H., He, D., Ma, J., and Chen, G. H. (2010). Application of permanganate in the oxidation of micro pollutants: a mini-review. *Frontiers of Environmental Science & Engineering in China* 4(4): 405-413.]. Finally, the oxidation of toxic $SO_2$ gas in the external reactor to benign $SO_4^{2-}$ and protons is another chemical species that could potentially be oxidised using the anolyte in the outer circuit. This is of particular interest due to the low redox potential of just −0.17 V and the regeneration of protons to counter the catholyte reaction.

BRIEF DESCRIPTION OF THE DRAWINGS

The invention will now be described in more detail, by way of example only, with reference to the accompanying drawings, in which.

DETAILED DESCRIPTION OF PARTICULAR EMBODIMENTS

Different arrangements may be considered for this RFB hydrogen generator, however, only one is specifically discussed in the following description. It involves the production of hydrogen and oxygen only.

Figure 1:
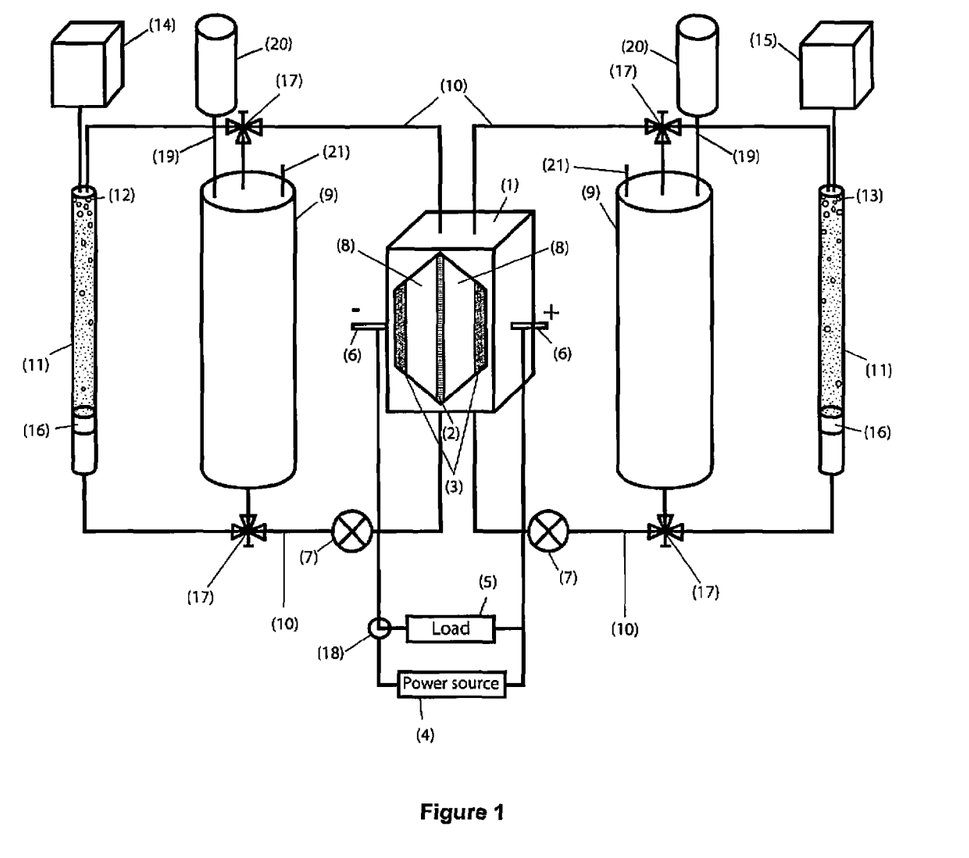
FIG. 1 schematically shows a redox flow battery system according to an embodiment of the invention.

FIG. 1 shows an arrangement for the RFB combined with the catalytic beds. The central part is the electrochemical cell 1, which comprises an ionic membrane 2, and two carbon felt electrodes 3. The electrodes may fill both half-cells cavities. Connection to an external power source 4, or an electrical load 5 is shown at sites 6 connecting to the current collectors upon which the felt electrodes 3 are pressed. Pumps 7 transfer both electrolytes 8 from their respective storage tank (or reservoir) 9 to the electrochemical cell 1, where they contact the electrodes. The electrolytes then flow back to their respective storage tanks, through gas tight tubing 10. Inert gas such as nitrogen or argon may be supplied from tanks 20 via inlets 19. To ensure there is no build up of pressure the inert gas can exit the tanks via outlets 21. Herein we call this the "internal circuit".

When both redox species are totally converted, as determined by UV/vis spectroscopy for example, a portion may be diverted from the reservoir or battery to the catalytic columns 11, leading to the formation of hydrogen gas 12, and oxygen gas 13, which may be collected in appropriate gas storage tanks 14, 15. After passing through the catalytic beds, each electrolyte passes through a filter, such as a fritted glass 16, in order to separate the catalytic particles, and then return to their respective storage tanks in the discharged form. Valves 17 are used in order to direct the electrolytes flow. This is what we designate the "external circuit".

The first step is to completely convert both mediators in the electrolytes 8 during the charging process. The energy required to achieve this may be sourced from the conventional electric grid at off-peak times, or ideally from renewable energy sources by using solar or wind power. After total conversion, the user has two choices: either a classical discharge of the RFB through an electrical load 5 of an energy consuming system (via grid), or transfer of both mediators through the catalytic columns 11, generating $H_2$ and $O_2$. During the reactions of catalysed chemical reduction (cathodic side), and catalysed chemical oxidation (anodic side), the electrochemical mediators are regenerated, and the process of charging may be repeated.

The electrodes used in a laboratory scale system according to FIG. 1 were 5 mm-thick carbon felt pieces (SIGRACET®, SGL Group, Germany), which were first treated at 400° C., for 4 h, in air. This pre-treatment was to increase the hydrophilicity and electrochemical activity of the electrodes, according to Li, L., Kim, S. et al. (2011). A Stable Vanadium Redox-Flow Battery with High Energy Density for Large-scale Energy Storage. *Advanced Energy Materials* 1: 394-400. A high hydrophobicity may be an issue, as air bubbles may be trapped inside the electrodes, and decrease drastically the electrode's efficiency. Electrode active surface area is strongly related to the specifications of the battery, and has to be dimensioned according to the intended current and power range. Here, 2.5 $cm^2$ geometric area carbon felt pieces for both electrodes were used. The current collectors were a platinum wire at the anode, and a graphite rod at the cathode, or two boron-doped diamond plates as both cathodic and anodic current collectors. Only one monopolar electrochemical cell was tested, however, bipolar electrode stacks may also be used in a large-scale redox flow battery, and, furthermore, alternative current collection systems may be used. In the present setup, the electrochemical cell consisted of two chambers of approximately 1.5 $cm^3$ in polyethylene (PE), both electrodes are only separated by the membrane, and are slightly compressed against the current collector in order to improve the conductivity. The design of the electrochemical cell is of importance for the RFB efficiency, in the sense that ohmic losses (due to large distances between the cathode and the anode, for instance) or bypass currents (in the case of bipolar electrodes) may increase the voltage required to charge the battery, and thus lower its overall efficiency.

Various types of ion-selective membranes (or ion-exchange membranes) are used for RFBs, such as ion-exchange filled pore membranes, perfluorinated membranes, and anion-exchange membranes [Li, X., Zhang, H., Mai, Z., Zhang, H. and Vankelecom I. (2011). Ion exchange membranes for vanadium redox flow battery (VRB) applications. *Energy and Environmental Science* 4(4), 1147-1160]. According to this reference, three criteria are relevant for the choice of the membrane; ion conductivity, ion selectivity, and chemical stability of the membrane. In the present invention, a Nafion N117 (Ion Power Inc., New Castle, Del., US) membrane was used, despite not having optimal ion conductivity and selectivity. Before the first use, the membrane was treated in 3% (weight) $H_2O_2$ for 1 h, and then in 1M $HNO_3$, at 80° C., for 2 h, and washed at least three times with deionized water. The choice of the membrane is a central issue for the efficiency and the functioning of the battery. If the redox mediator cations can pass through the membrane (crosscurrents), the efficiency may, in the long term, strongly decrease, and the electrolyte's lifetime is shortened. Moreover, higher resistivity of the membrane increases the voltage that has to be applied for the charging process, and a lower voltage is obtained during a conventional RFB discharge. Furthermore, the choice between anionic or cationic membrane is important as it dictates the direction in which the ions travel. This may be crucial for the functioning of the system, since some of these ions are transformed into gases that then leave the system. This will necessitate compensation of the electrolyte periodically. Finally, depending on the type of membrane used, various electrolyte compositions may be used on each side. In the present system, only the addition of pure water would be required to replenish the electrolytes.

The composition of the electrolytes is another key aspect of the present invention: it influences both the RFB electrochemical cell functioning and capacity, and catalytic bed efficiency and poisoning. The main parameters are the mediator redox couples and their respective concentrations, the supporting electrolyte and its concentration, the pH, and the volume of both electrolytes. Moreover, deoxygenation of the system has to be considered for the cathodic side especially. As mentioned earlier, the choice of mediator redox couples is based on the reactions that will occur in the catalytic beds and on the reversibility of their electrode reactions. For oxygen and hydrogen generation, for instance, we use a cerium-vanadium redox flow battery (Ce—V RFB), and the charging reactions are given by reactions 5a and 6a, and the discharge or chemical regeneration half reactions by reactions 5b and 6b.

In the anolyte:

$$Ce^{3+} \rightarrow Ce^{4+} + e^- \text{(charge)} \quad (5a)$$

$$Ce^{4+} + e^- \rightarrow Ce^{3+} \text{(discharge or chemical regeneration in the catalytic bed)} \quad (5b)$$

In the catholyte:

$$V^{3+} + e^- \rightarrow V^{2+} \text{(charge)} \quad (6a)$$

$$V^{2+} \rightarrow V^{3+} + e^- \text{(discharge or chemical regeneration in the catalytic bed)} \quad (6b)$$

This particular RFB arrangement has been studied by a number of authors since 2002 [e.g. Paulenova, A., Creager, S. E., Navratil, J. D. and Wei, Y. (2002). Redox potentials and kinetics of the Ce(IV)/Ce(III) redox reaction and solubility of cerium sulfates in sulfuric acid solutions. *Journal of Power Sources* 109: 431-438; Leung, P. K., Ponce de León, C., Low, C. T. J., and Walsh, F. C. (2011). Ce(III)/Ce(IV) in methanesulfonic acid as the positive half cell of a redox flow battery. *Electrochimica Acta* 56: 2145-2153]. The cerium (IV)/(III) couple is highly sensitive to the nature and concentration of the acid medium, with the redox potential increasing in the order $HCl<H_2SO_4<HNO_3<HClO_4$ from +1.28 V to +1.70 V in 1 M acid [Binnemans K, Application of Tetravalent Cerium Compounds in *Handbook on the Physics and Chemistry of Rare Earth*, Vol 36, 2006]. The reversibility of the cerium couple is also highly dependent on the acid, with sulfate ligands decreasing reversibility considerably, and stabilising the Ce(IV) state.

In the present system, the initial salts that are used are $VCl_3$ and $Ce_2(SO_4)_3$ or $Ce(NO_3)_6(NH_4)_2$, and their concentrations range, between 0.5 M and 3 M [Li, X. (2011), supra], and 0.5 M to 2 M [Leung, P. K. (2011) supra], respectively. The higher the concentrations, the higher the energy density of the RFB. The solubility of the cerium species in high concentration solutions may be problematic [Paulenova et al. (2002), supra], but an additive, which increases the solubility, may be added to the electrolyte, such as methanesulfonic acid [Leung (2011), supra, U.S. Pat. No. 7,270,911 B2], for instance. The supporting electrolyte is often an acid, and, in most publications, is $H_2SO_4$, with a concentration between 0.1 and 2 M [Li, X. (2011), supra, Rychcik, M. and Skyllas-Kazacos, M. (1988) Characteristics of a new all-vanadium redox flow battery. *Journal of Power Sources* 22: 59-67]. Due to the variation in reduction potential of Ce(IV) in different acids, nitric acid is also an electrolyte in the Ce—V RFB used herein. This acid is used only in the anolyte however, due to the reduction of $NO_3^-$ to NO at 0.96 V vs SHE. The supporting electrolyte has the function of decreasing ohmic losses due to migration of the electrochemical species in the electric field generated by both electrodes, and it can also retain the redox species in their desired oxidation state and allow for better solubility of the different mediators. Deoxygenation of the system with $N_2$ or Ar is necessary for the stability of the V(II) ions in the catholyte. The inert gas inlets, positioned on the electrolyte tanks allow deoxygenation of both the internal and external circuits.

Considering the requirements of the catalytic beds 11 with respect to the electrolytes 8, the acid concentration strongly affects the hydrogen generation reaction efficiency, but may also affect the efficiency of the chemical oxidation of water. Moreover, the stability of both catalysts upon rather harsh acidic or alkaline conditions must be considered as well. Furthermore, an efficient system needs to ensure that no catalyst-poisoning by-products are generated at the electrodes, and inversely that no electrode-poisoning compounds are produced in the catalytic beds. The concentration of both redox mediators is another factor to take into account when designing the electrochemical cell; if their concentration is high, the amount of catalyst should be adapted.

In the present description, only one storage tank 9 for each electrolyte 8 is shown, though various arrangements exist, as mentioned in Lepp et al., U.S. Pat. No. 7,740,977 B2, for instance. Their size depends on the requirements for the storage capacity of the battery. They are connected to the electrochemical cell through Teflon-based pipes that are tightly bound both to the electrochemical cell and the storage tanks. Pumps are used to pump the electrolyte from the storage tanks to the electrochemical cell, and back to the storage tanks. The main characteristic of a pump is the flow rate that it can drive, which is related to its power consumption. The flow rate of the pump should be designed according to the intended current density of the electrodes, and an adequate flow through the catalytic beds (depending on the kinetics of the reaction). The energy to feed the pumps should be as low as possible to increase the overall efficiency of the system. In the preliminary system, a peristaltic pump was used, working at a flow rate of 10 mL/min through the electrochemical cell 1 and 0.1 mL/min through the catalytic chambers 11.

The catalytic beds 11 are assembled as follows: In a glass column (e.g. chromatography column) a frit is placed at the bottom with a view to separating the catalyst doped silica or carbon particles and the electrolyte. A hydrogen or oxygen collector is present at the upper aperture of the column, and the gas is then stored in a hydrogen 14 or oxygen 15 storage tank. The choice of catalyst dictates the efficiency of the chemical conversion of the mediators, and the gases generated. The selectivity and the catalytic activity of the catalyst are two important aspects that have to be examined before possible application in a dual-circuit RFB.

Figure 2:
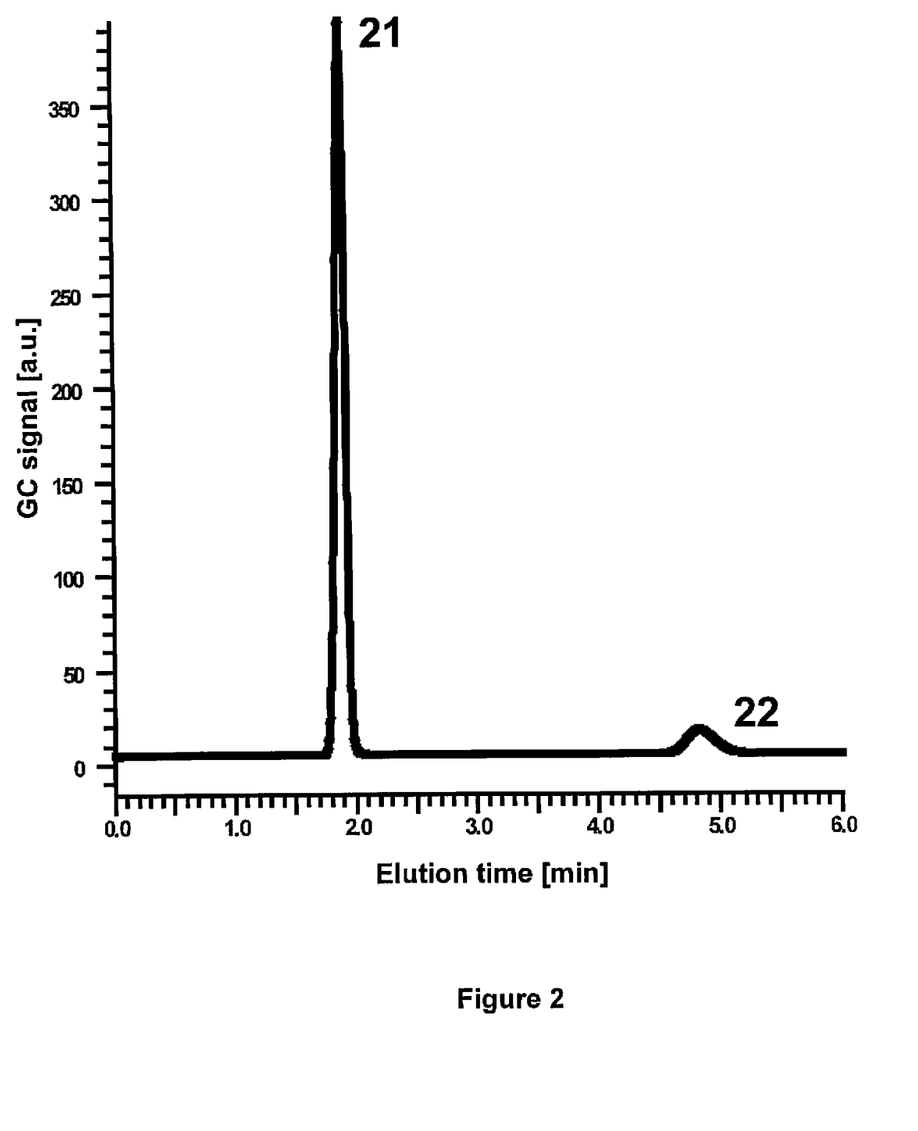
FIG. 2 is a gas chromatography (GC) measurement showing the evolution of hydrogen from the catholyte in the system of FIG. 1.

Among the various catalysts found in the literature for $H_2$ generation, molybdenum-based catalysts were evaluated and tested in the present system. More specifically, $MoS_2$, $MoS_3$, and $Mo_2C$ were studied. Gas chromatography (GC) results have shown that the molybdenum-based catalysts produce significant amounts of $H_2$ (Peak 21, FIG. 2), where V(II) is the electron donor, and the sulfuric acid protons the electron acceptors. The overall chemical reaction of hydrogen production is:

$$2V^{2+} + 2H^+ \rightarrow 2V^{3+} + H_2 \text{ (in the presence of Mo-based catalyst)} \quad (7)$$

This reaction can be monitored quantifiably using UV/vis spectrometry, in which the second, lower energy peak observed in the visible spectrum for V(II) 32 (FIG. 3) is quantified over time during the reaction with the Mo catalyst. Kinetic information regarding the rate of reaction can be ascertained with the spectrophotometric data, as V(II) concentration can be plotted against time (FIG. 4). The plot in FIG. 4 gave an apparent rate constant for the catalysed reaction between V(II) and protons to be pseudo first order with respect to the V(II) concentration. The apparent rate constant, $k_{app}$, was determined to be $k_{app}=5.88\times10^{-3}$ s$^{-1}$, though the reaction rate also varied with proton concentration and catalyst amount.

Figure 5:
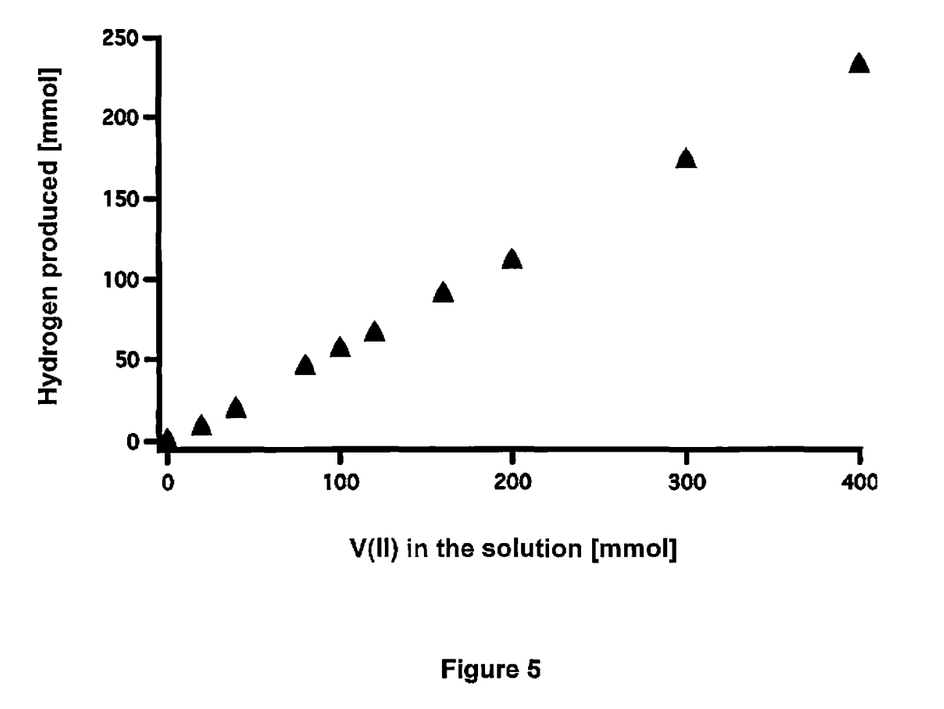
FIG. 5 is a catalytic conversion plot displaying generated hydrogen obtained from GC analysis vs the amount of V(II) in the solution.

The reaction efficiency with respect to conversion of various concentrations of V(II) to V(III) and $H_2$ can also be monitored using gas chromatography. The results are shown in FIG. 5 and indicate a 100% conversion efficiency of V(II) to $H_2$ gas, within the experimental errors.

Figure 6:
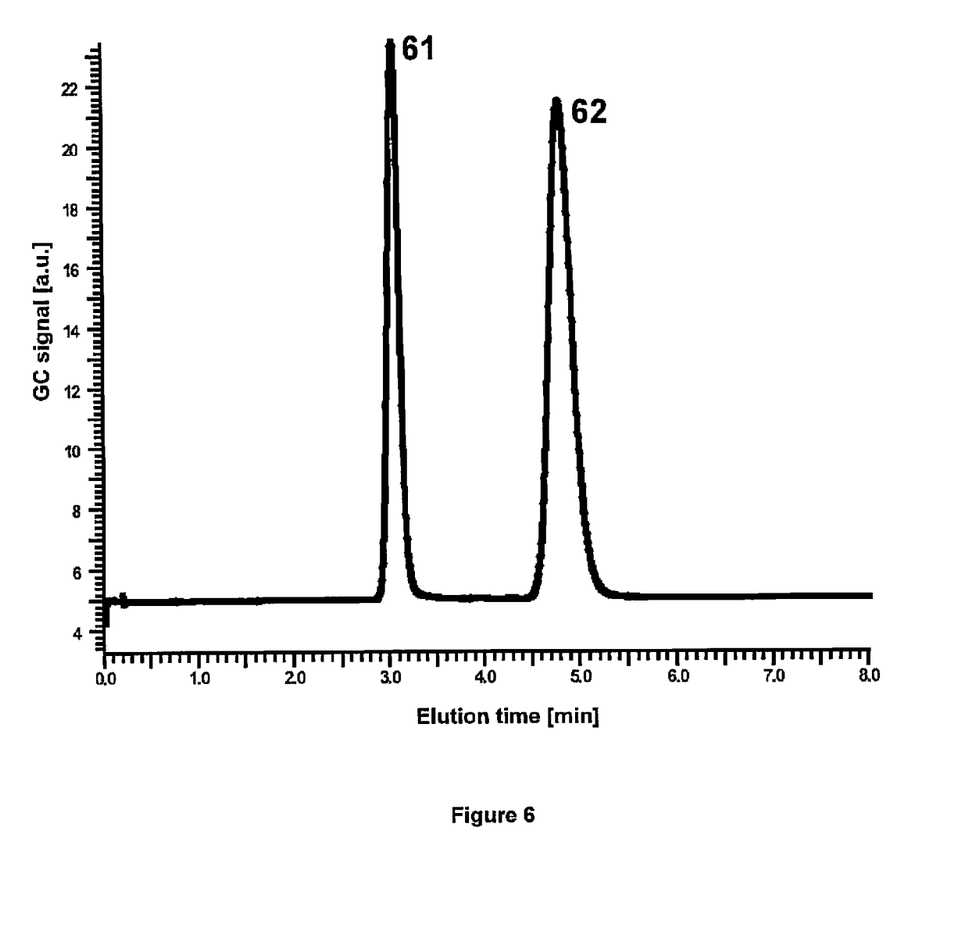
FIG. 6 is a GC measurement showing the evolution of oxygen from the anolyte in the system of FIG. 1.

For water oxidation, $IrO_2$ nanoparticles have been selected due to their well-known catalytic properties for this reaction, and the stability of $IrO_2$ nanoparticles in acidic pH. Some preliminary tests were somewhat successful in the presence of Ce(IV) as electron acceptor, in 1 M $H_2SO_4$, and in neutral solution (i.e. pure water). In 1 M $HNO_3$ with cerium (IV) ammonium nitrate (CAN) the catalysed water oxidation is significantly better, visibly evolving copious amount of oxygen and rapidly converting yellow Ce(IV) to colourless Ce(III). FIG. 6 shows a GC result for oxygen evolved during reaction of Ce(IV) and $IrO_2$ in a sealed glass vial. The overall catalysed chemical reaction of oxygen production is:

$$4Ce^{4+} + 2H_2O \rightarrow 4Ce^{3+} + O_2 + 4H^+ \quad (7)$$

Figure 7:
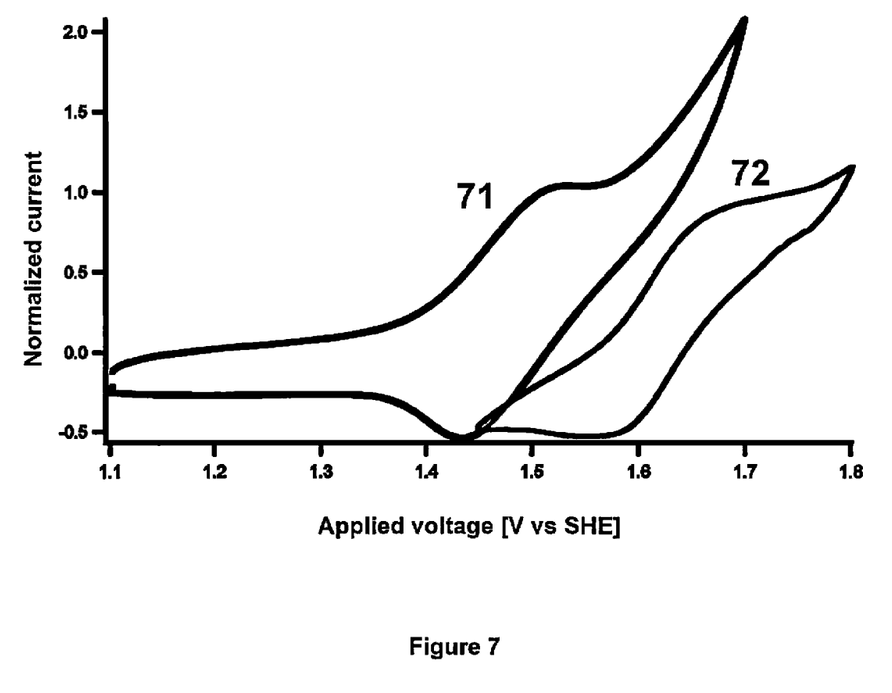
FIG. 7 is an overlay of two cyclic voltammograms for the Ce(III)/(IV) redox couple in sulfuric acid and nitric acid, both in the presence of methanesulfonic acid.

Although in sulfuric acid the Ce(IV)/(III) redox couple is thermodynamically capable of oxidising water, an intrinsic kinetic limitation of water oxidation tends to an actual oxidation potential higher than the 1.23 V thermodynamically suggested [Koper, M. T. M. (2011) Thermodynamic theory of multi-electron transfer reactions: Implications for electrocatalysis *Journal of Electroanalytical Chemistry* 660: 254-260]. As such, the Ce(IV) reduction potential in 1 M $H_2SO_4$ is too low (1.44 V vs. SHE) to oxidise water, but in 1 M $HNO_3$ the reduction potential is 1.61 V vs SHE. Cyclic voltammetry of the cerium solutions were obtained at graphite polymer electrodes in sulfuric acid 71 and nitric acid 72, and the shift in redox potential is evident in FIG. 7. Considerably better reversibility for the cerium couple is obtained in both sulfuric and nitric acid when methanesulfonic acid is also used. Consequently, the use of nitric acid as anolyte and sulphuric acid as catholyte is necessary to operate the dual-catalytic system towards hydrogen and oxygen evolution when using the $IrO_2$ catalyst and Ce(IV)/(III) redox couple described herein.

Figure 8:
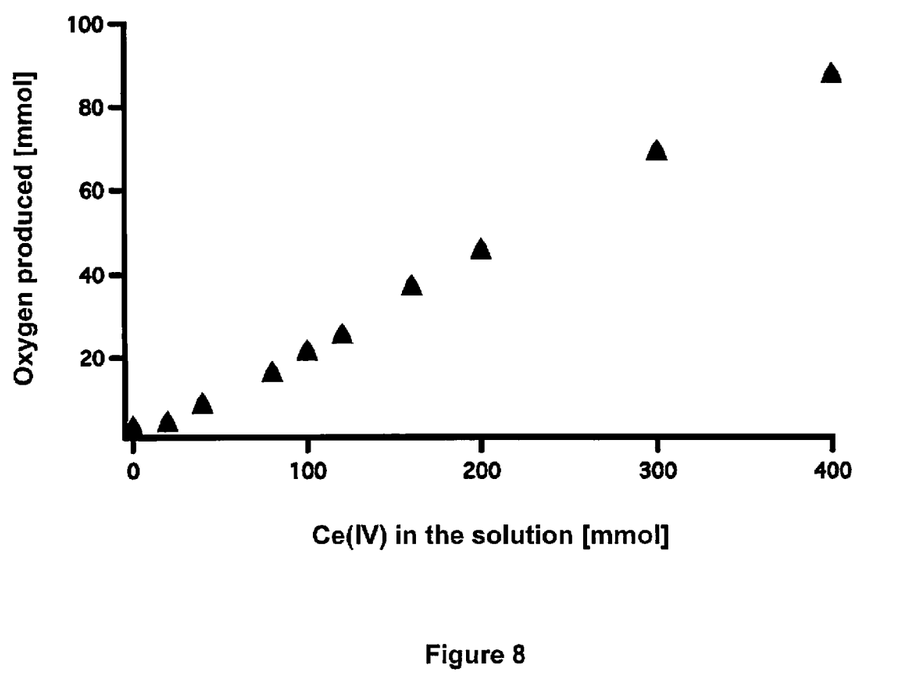
FIG. 8 is a catalytic conversion plot showing the moles of oxygen produced (determined by Gas Chromatography) vs the amount of Ce(IV) in the solution.

The conversion efficiency of Ce(IV) to Ce(III) and $O_2$ is shown in FIG. 8 following catalytic oxidation of water using various concentrations of the mediator. GC samples were taken from the sealed headspace of glass vials containing the charged anolyte and catalyst. The plot shows an 86% conversion efficiency for $O_2$ evolution.

For the present application, the catalysts must be separated from the electrolytes after completion of the chemical reaction. Consequently various strategies may be adopted: Either the nanoparticle catalysts are filtered by a nanofilter, or the catalysts are deposited on a cheap substrate, such as silica particles, and the separation is done by a simple microporous frit, or finally, the catalysts are strongly attached to the walls of thin tubes, through which the electrolytes flow.

When $MoS_2$ was used, it was deposited on silica particles by co-synthesis of the catalyst precursor ($MoS_3$) and silica particles, in alkaline conditions (molar ratio $MoS_3:SiO_2$ 1:10) [Rivera-Muñoz, E., Alonso, G., Siadati, M. H., and Chianelli, R. R. (2004). Silica gel-supported, metal-promoted MoS2 catalysts for HDS reactions. *Catalysis Letters* 94 (3-4):199-204].

The $IrO_2$ nanoparticles were also deposited on silica to produce a violet powder. This was achieved by first coating the silica particles with a cationic layer of poly(diallyldimethylammonium chloride (PDDA), by stirring the silica in a solution of NaCl and the PDDA for 1 h at room temperature. The silica solution was then centrifuged and washed 3 times with deionisied water, then dried in air at 80° C. for 10 min. The PDDA-silica was then added to a suspension of $IrO_2$ nanoparticles, synthesised according to Hara et al. [Hara, M., Lean, J. T., Mallouk, T. E. (2001): Photocatalytic oxidation of water by silica-supported tris(4,4'-dialkyl-2,2'-bipyridyl)ruthenium polymeric sensitizers and colloidal iridium oxide. *Chem. Mater.* 13(12): 4668-4675], for 1 hour at room temperature. Each silica-supported catalyst was then filtrated or centrifuged, and dried at 80° C. for 10 min before use. $Mo_2C$, however, has been used as received (Molybdenum carbide, -325 mesh, 99.5%, Aldrich, Switzerland), as it is already in a powder form, which is highly insoluble and predominantly micron sized and above.

As already mentioned, alternative arrangements may be investigated, such as bipolar electrodes for more efficient conversion in the electrochemical cell or a second tank for each electrolyte to improve the efficiency of hydrogen and oxygen production (in the case that not all of the mediator is converted in the first passage in the electrochemical cell). Also, according to the type of chemical reactions that regenerate the mediators, the installation may be slightly adapted to requirements of the chemical compounds (i.e. choice of membrane, of the redox couple, of the catalyst, of the storage system).

FIG. 2 is a GC measurement for the determination of hydrogen following the reaction between the reduced catholyte and $Mo_2C$. The bottle contained a catalytic amount of $Mo_2C$ (1 mg) and 2 mL of 20 mM V(II), in 1 M $H_2SO_4$, and the sample was taken after 1 h of reaction (i.e. completion of the reaction). The first peak 21 represents the hydrogen produced, whereas the second peak 22 is for the nitrogen gas in the sample. Various "blank" experiments (without catalyst and/or electron donor) were conducted in order to verify this result.

Figure 3:
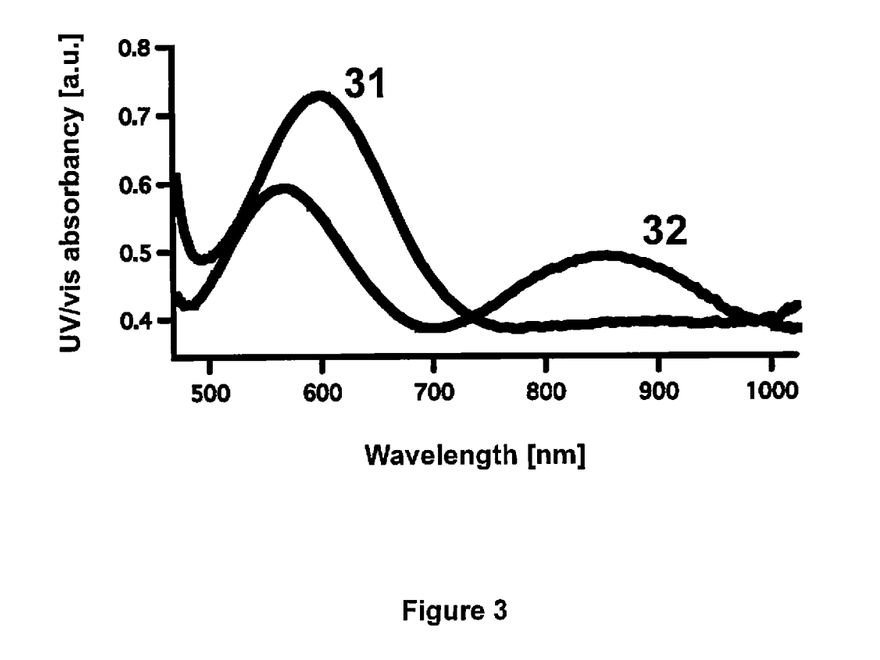
FIG. 3 is an overlay of UV/vis spectra obtained for 100 mM V(II) and V(III) before and after catalytic evolution of hydrogen from the catholyte in FIG. 1.
Figure 4:
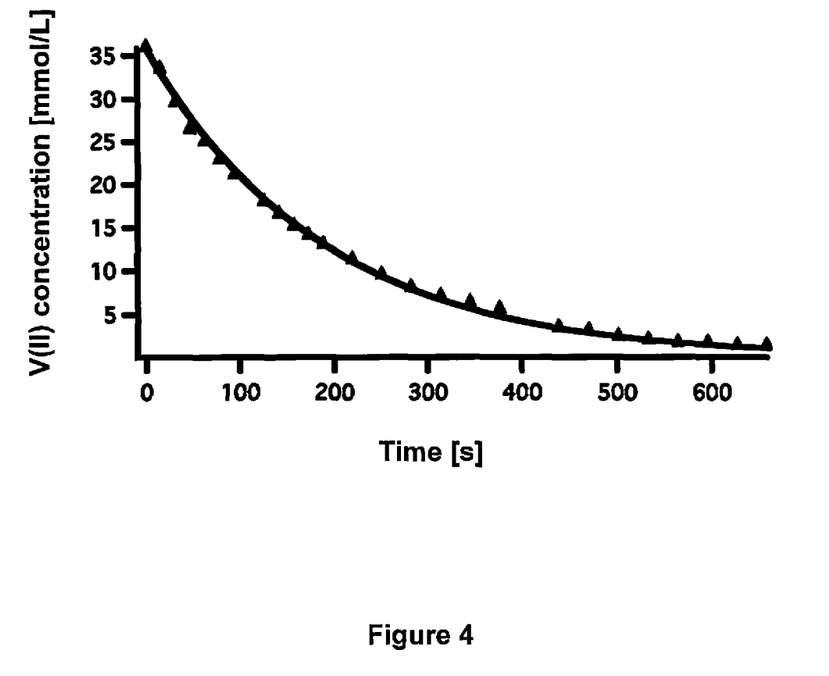
FIG. 4 is a plot monitoring V(II) concentration depleting over time, obtained using UV/vis spectra comparable to those shown in FIG. 3.

FIG. 3 is an overlay of UV/visible spectra for the conversion of V(II) to V(III) over time in the presence of $Mo_2C$. The reduced catholyte was taken following reduction in the RFB, and comprised 100 mM V(II) in 1 M $H_2SO_4$ in the starting condition. Following the addition of 5 mg $Mo_2C$ to a 2 mL sample, UV/vis spectra were taken every 30 s until completion (i.e. single peak for V(III) at 600 nm). The depletion of the second, lower-energy peak for V(II) 32 was monitored during kinetic analysis, allowing a pseudo first order reaction with respect to V(II) concentration to be determined.

FIG. 5 is a plot for the total generation of hydrogen versus the concentration of V(II). Based on the mole ratios given in equation 6, the chemical reduction of protons to hydrogen occurs with 100% efficiency (i.e. 100 mmol V(II) gives 50 mmol of hydrogen).

FIG. 6 represents a GC measurement for the determination of oxygen after 1 hour of stirring of the following solution: 2 mL of 100 mM Ce(IV) ammonium nitrate in 1 M $HNO_3$, in the presence of 5 mg of the $IrO_2$-silica. Peak 61 shows the presence of $O_2$, and peak 62 the presence of N2. These peaks were compared to "blank" samples, where only peak 62 was observed.

FIG. 8 shows the amount of oxygen produced, and measured in the headspace by GC, as a function of the amount of Ce(IV) in 2 mL of Ce(IV) in 1M $HNO_3$. The mean conversion is 86%, indicating some minor side reactions.

Example 1

The Production of Hydrogen

Hydrogen gas was successfully generated from a 2 mL solution containing 1M $H_2SO_4$, 20 mM V(II), and 3 mg of silica supported $MoS_2$ or as-bought $Mo_2C$ powder ($SiO_2$:$MoS_2$ molar ratio is 10:1), under anaerobic conditions, with magnetic stirring for 1 h. The atmosphere (headspace) above the liquid was sampled by a gas-tight syringe and injected into the GC. The result for $Mo_2C$ (FIG. 2) shows the clear presence of $H_2$ (peak 21) compared to the initial presence of $N_2$ (peak 22).

Example 2

The Production of Oxygen

Chemical water oxidation to form oxygen gas has been clearly observed in the following experimental conditions: in a septum-sealed glass vial a 2 mL solution of 100 mM cerium ammonium nitrate (Ce(IV)) in 1 M $HNO_3$ generated in the RFB reacted in the presence of 3 mg $IrO_2/SiO_2$ under anaerobic conditions, and under stirring for 1 h. The atmosphere was sampled using a gas-tight syringe and injected into the GC. The result (FIG. 6) shows the presence of $O_2$ (peak 61), and $N_2$ (peak 62), the background gas of the experiment.

Example 3

Dimensioning of the Electrolyte

For the production of 1 L of $H_2$ and 0.5 L of $O_2$ in standard conditions (i.e. 44.6 mmol of $H_2$, and 22.3 mmol of 02), 89.3 mmol of V(II) and Ce(IV) are required. For arbitrary concentrations of 2 M, the catholyte and anolyte have a volume of 89.3 mL. Each electrolyte may also contain an acidic supporting electrolyte (e.g. $H_2SO_4$) at a concentration of 1 M, and an additive for increasing the solubility and stability of the redox species. On a larger scale, in a Skyllas-Kazacos all-vanadium redox flow battery [Rychcik (1988), supra], 80 L of each electrolyte was used for a 1 kW battery. The open-circuit potential was close to 25 V (17 cells), and the current obtained was 65 A during the charging process and approximately 40.5 A during the discharge process.

The invention claimed is:

1. A redox flow battery system, comprising:
   a. A redox flow battery, comprising:
      i. An electrochemical cell having a first compartment containing a positive electrolyte with an electrode at least partially immersed in the positive electrolyte, a second compartment containing a negative electrolyte with an electrode least partially immersed in the negative electrolyte, and a membrane mutually separating the first and second compartments,
      ii. First and second storage tanks for the storage of the positive and negative electrolytes respectively, at different states of charge,
      iii. Pumps to pump the positive and negative electrolytes from the compartments to the storage tanks and from the storage tanks to the compartments,
      iv. A source and inlet of inert gas to deoxygenate the system and stabilise the charged electrolytes;
   b. A first catalytic bed, for oxidatively forming a chemical species from the positive electrolyte, and regeneration of the positive electrolyte for reuse in the redox flow battery;
   c. A second catalytic bed, for the reduction of protons from the negative electrolyte into molecular hydrogen gas, and regeneration of the negative electrolyte for reuse in the redox flow battery; and
   d. Valves for directing the electrolytes between different parts of the system.

2. The system according to claim 1, wherein the positive electrolyte comprises a redox couple selected from $Ce^{4+}/Ce^{3+}$, $V^{5+}/V^{4+}$, $MnO_4^-/Mn^{2+}$, $Mn^{3+}/Mn^{2+}$, $Co^{3+}/Co^{2+}$, and $Br^-/BrO_3^-$.

3. The system according to claim 1, wherein the positive electrolyte comprises an additive for increasing the solubility of the redox couple.

4. The system according to claim 3, wherein said additive is methanesulfonic acid when the redox couple is $Ce^{4+}/Ce^{3+}$.

5. The system according to claim 1, wherein the negative electrolyte comprises a redox couple selected from V(III)/V(II), $Ti^{3+}/Ti^{2+}$, $Cr^{3+}/Cr^{2+}$, and $Zn^{2+}/Zn$.

6. The system according to claim 1, wherein the membrane is an ion-exchange membrane such as a sulfonated tetrafluoroethylene based fluoropolymer-copolymer, or a nanofiltration membrane or a simple diaphragm such as asbestos.

7. The system according to claim 1, wherein the electrodes are selected from metallic electrodes, carbon felt electrodes, and other carbon electrodes.

8. The system according to claim 7, wherein the electrodes are carbon electrodes modified by nanoparticle catalysts.

9. The system according to claim 1, wherein said chemical species is $O_2$.

10. The system according to claim 1, wherein an additional compound is mixed with the positive electrolyte prior to the passage to the first catalytic bed.

11. The system according to claim 10 wherein the additional compound is chloride to produce chlorine, $SO_2$ to produce $H_2SO_4$, or any organic compound to produce $CO_2$.

12. The system according to claim 1, wherein the first catalytic bed comprises $IrO_2$, $RuO_2$, Mn and/or Co oxides for the oxidation of water into oxygen.

13. The system according to claim 1, wherein the second catalytic bed comprises precious metals such as palladium or platinum, $MoS_2$ or $Mo_2C$ for the reduction of protons to hydrogen.

14. The system according to claim 1, wherein the electrochemical cell comprises a bipolar stack of electrodes.

* * * * *